United States Patent [19]

Della Vecchia

[11] Patent Number: 4,872,422

[45] Date of Patent: Oct. 10, 1989

[54] SCRATCHING AND PETTING DEVICE FOR HOUSEHOLD PETS

[76] Inventor: Rita A. Della Vecchia, 61909 Dobbin Ct., Bend, Oreg. 97702

[21] Appl. No.: 164,188

[22] Filed: Mar. 4, 1988

[51] Int. Cl.$^4$ ............................................. A01K 13/00
[52] U.S. Cl. ....................................... 119/83; 128/49; 128/62 R
[58] Field of Search .................... 119/1, 29, 83, 157, 119/85; 128/61, 62 R, 49

[56] References Cited

U.S. PATENT DOCUMENTS

| | | | |
|---|---|---|---|
| 835,796 | 11/1906 | Lindsley | 272/76 |
| 2,865,329 | 12/1958 | Elliott | 119/83 |
| 3,078,843 | 2/1963 | Brisson | 128/62 R |
| 3,403,674 | 10/1968 | Alimanestriano | 128/61 |
| 3,552,388 | 1/1971 | Zelenka | 128/55 |
| 3,675,921 | 7/1972 | Meyers, Sr. | 273/1.5 A |
| 4,556,014 | 12/1985 | Huntsman | 119/29 |
| 4,593,900 | 6/1986 | Burke | 272/76 |
| 4,608,967 | 9/1986 | Piro | 128/61 |
| 4,817,227 | 4/1989 | Scott | 128/62 R |

Primary Examiner—Gene Mancene
Assistant Examiner—Michael Lynch
Attorney, Agent, or Firm—Keith S. Bergman

[57] ABSTRACT

A mechanical device to scratch and stroke household pets upon demand is disclosed. A base fastenable on a vertical structural element mounts a petting arm for vertically adjustable and foldable positioning perpendicularly thereto. The petting arm is a compound member interconnected in its medial part by a motivating mechanism that moves the outer portion, carrying a hand-like petting element in a petting and stroking fashion. The motivating mechanism may be electrically activated and if so may include an electronic eye or position sensitive switch to sense pet position to institute petting upon pet demand. Vertical adjustment of the petting arm on the base allows use of the device with various sized animals.

8 Claims, 2 Drawing Sheets

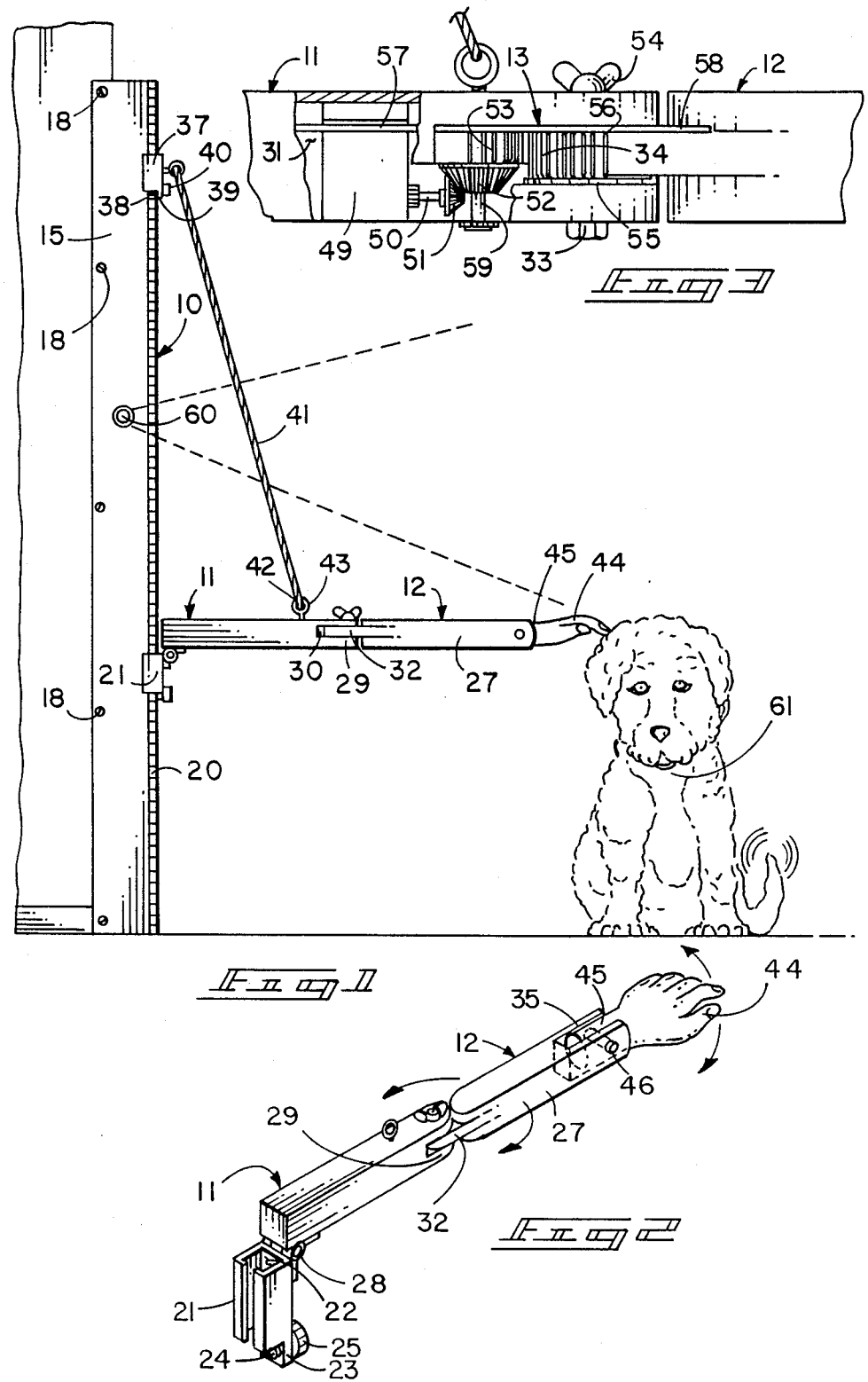

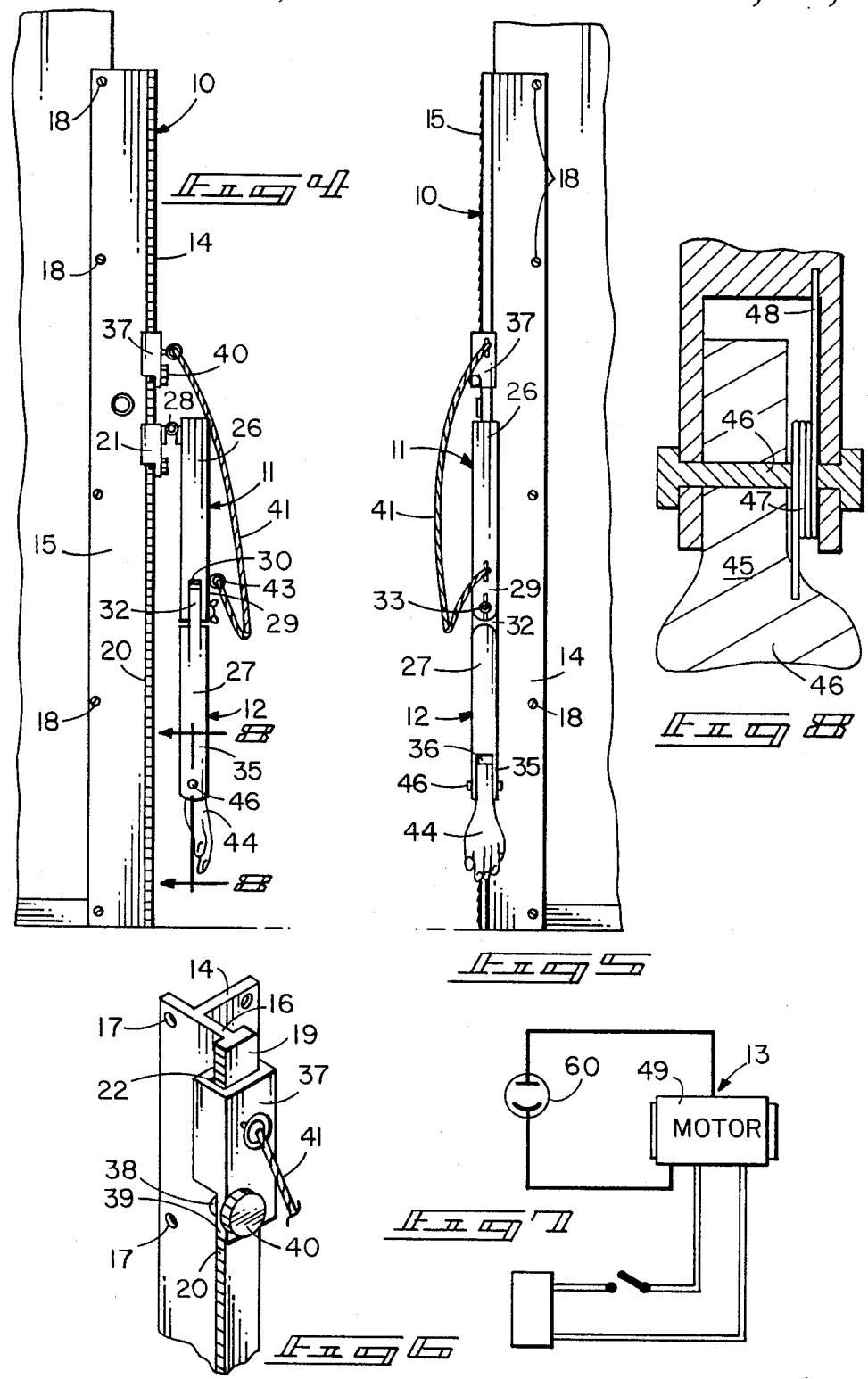

SCRATCHING AND PETTING DEVICE FOR HOUSEHOLD PETS

BACKGROUND OF INVENTION

Related Applications

There are no applications related hereto heretofore filed in this or any foreign country.

Field of Invention

My invention relates generally to mechanically activated scratching or petting devices for domestic pets and more particularly to such a device that may be activated upon demand to simulate ordinary human petting or scratching of the pet.

Background and Description of Prior Art

Undoubtedly as long as domestic pets have been known, they have had a particular symbiotic relationship with man and in fact, that relationship is the chief factor in distinguishing a domestic pet from its wild progenitors. This relationship has carried into the modern day but with cultural changes, and particularly the rush and lack of time in modern day culture, the relationship oftentimes is not properly or adequately developed.

One of the primary elements of this relationship of man with domestic pets seems to be the scratching, stroking and petting of a pet that can be accomplished by its human symbiont by reason of his greater dexterity. Though this petting process seems to be a necessary and essential element of a human relationship with pets, it oftentimes is neglected, undoubtedly to the sensual displeasure of the animal involved and quite possibly to the potential disruption of the relationship with that animal. The instant invention provides a mechanical device to simulate this activity for pets without requiring human attention, with the thought that, by reason of the learned behavior of such animals, the animal will associate this activity, as to its source of origin, with its human symbiont. The importance of this petting and stroking action on various animals, including even human infants, has heretofore been recognized and responsively various mechanical devices have been developed to accomplish the function. In general, such devices have been directed more toward human infants then household pets and when directed towards pets, such devices have generally accomplished some secondary function such as dobbing the pet with medication, grooming it, removing loose hair, or the like that often derogates from the petting. My invention differs from this general known type device in that it provides a specific mechanism that is especially designed and adapted to accomplish its particular purpose.

Many prior art devices heretofore known that have simulated a petting, stroking or scratching activity of a pet have been stationary objects with any motion involved being contributed by a particular pet being serviced. This type of device is readily distinguished from my invention as such known devices require a reasonably high amount of mental activity and training on the part of the pet to teach it to use the device to accomplish its intended purpose. My invention in contradistinction requires only the presence of the pet in the immediate vicinity of the device with all of the scratching, stroking and petting activity being accomplished by the mechanism of the device itself.

My invention is further distinguished from prior art devices in providing both a petting and scratching element and function that simulate human activity, whereas prior art devices have neither simulated this activity by the nature of the particular element involved nor by its motion. My invention uses a hand-like element for immediate pet contact which by reason of normal associative animal psychology better accomplishes its purpose in a more aesthetically pleasing fashion and also causes normal association of that activity with a human counterpart which has previously accomplished the same type of activity by similar means. The accomplishments of my invention are therefore substantially different from those of prior art devices having various differently designed active elements and motions of those elements.

My invention further provides a single adjustable structure that may be used with pets of varying sizes from substantially the smallest dogs and cats to the largest of dogs. Most prior art devices have provided some type of structure that either was not adjustable for size of animal to be serviced or if so, was adjustable only by the particular positioning of the base supporting structure on a supportative element. My invention provides a supportative base element with a rack and pinion mechanism to move a petting arm to an adjustable vertical position while still allowing that arm to be maintained with appropriate biases that operatively position it and yet allow motion from an operative position under varying operative circumstances and environments. My invention yet, while maintaining these features, also allows the petting arm to be folded downwardly against its supporting base for compact and convenient storage during periods of non-use.

My invention also allows optional methods of motivation, either by motors that may be powered mechanically or by electrically powered motors. In the case of electrical motors, an electric eye or other position-sensitive switch may be used to automatically activate the device, especially responsive to pet position relative thereto. Most prior art devices either were not automatically activated upon pet demand, or if they were, they required either manual switching to motivate them or else ran in a continuous fashion, both of which latter functions tended to reduce their convenience and usability. The activation of the device by pet positioning tends to further enhance the illusion to the pet of simulated human symbiotic activity, as petting activity commonly is associated with a pet's positioning itself appropriately to allow the activity.

My invention finds special use in the veterinary field where it may be used to sooth, placate and occupy animals during particularly stressful times without any directly required human attention. It in essence provides an extra hand or assistant for a veterinarian.

My invention resides not in any one of the foregoing structures or features, per se, but rather in the synergetic combination of all of them to provide the structures and functions necessarily flowing therefrom and hereinafter further specified and claimed.

SUMMARY OF INVENTION

My invention in general provides an elongate base mountable in vertical orientation on a structural element with a hingeably foldable petting arm extendable a spaced distance perpendicularly therefrom. The petting arm is vertically adjustable on the base by rack and pinion means communicating therebetween. The petting arm is hingeably interconnected with the rack and pinion support to allow movement from a vertically depending position to a perpendicularly extended horizontal position. A resilient support releasably interconnects the upper portion of the base with a medial portion of the petting arm to maintain that arm's horizontal operative position when desired.

The petting arm is of a compound nature with an outer pivotal portion that reciprocally moves through an angular segment in a horizontal plane to simulate petting or stroking motion. The outermost portion of the outer pivotal petting arm mounts a hand-like pet contacting element about a horizontal axis for vertical pivotal motion from a biased horizontal position. The petting element simulates a human hand in both shape and resilience. The reciprocating motion of the pivotal portion of the petting arm is accomplished by a motor associated therewith and acting through appropriate mechanical linkage. A pet proximity sensing switch institutes and maintains operation during pet presence.

In creating such a device, it is:

A principal object of my invention to provide a mechanism to simulate petting, stroking and scratching activity of a pet upon pet demand, as evidenced by a pet's presence in a particular position proximate the device.

A further object of my invention to provide such a device that has a vertically extending base supportable on a structure with a petting arm movable from a downward folded position to a horizontal operative position.

A further object of my invention to provide such a device that allows vertically adjustable motion of the petting arm while yet supporting that arm in its horizontally biased position.

A still further object of my invention to provide such a device that has a compound petting arm with a pivotally mounted outer portion and mechanism associated with the pivotal mounting to cause a reciprocally pivotal motion of the outer arm.

A still further object of my invention to provide such a petting arm wherein the outer portion of the pivotal part carries a hand-like element pivotally movable in a vertical plane, but biased to a horizontal position to further simulate human petting and scratching activities.

A still further object of my invention to provide such a device that has a switching element that senses pet position to institute and maintain mechanical petting activity responsively thereto.

A still further object of my invention to provide such a device that is of new and novel design, of rugged and durable nature, of simple and economic manufacture and is otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an orthographic side view of my invention showing its various parts, their configuration and relationship to each other and to a pet being serviced.

FIG. 2 is an isometric view of the petting arm of my invention showing various details of its construction.

FIG. 3 is an enlarged, partial cut-away view showing the internal mechanism interconnecting the two portions of the petting arm for powered pivotal motion relative to each other.

FIG. 4 is an orthographic side view of the device of FIG. 1 with the petting arm folded downwardly.

FIG. 5 is an orthographic front view of the device shown in FIG. 1.

FIG. 6 is an enlarged partial view of the upper support bracket showing especially the structure and operation of the rack and pinion mechanism.

FIG. 7 is a diagrammatic illustration, in normal symbology, of the electrical circuitry of my invention.

DESCRIPTION OF THE PREFERRED EMBODIMENT

My invention generally provides elongate vertically mounted base 10 carrying compound foldable petting arm 11 with pivotal petting element 12 in its outermost portion and motivating mechanism 13 moving the end portion of that arm in a reciprocating arcuate fashion.

The form of base 10 illustrated provides an elongate post-like element of "T" shaped cross-section formed by structurally interconnected legs 14, 15 and 16. This particular form of base structure is adapted for mounting on an external corner of a vertical wall with two arms adjacent the wall surfaces and petting arm leg 16 projecting outwardly from the corner formed by the walls. This configuration is not critical and the base element may be formed of varying cross-sectional shape appropriate to fit in internal corners or on a planar expanse of a vertical wall by removing leg 14 and lengthening petting arm leg 16, if necessary, to provide appropriate clearance for motion of the petting arm mounting structure thereon. The base legs 14, 15 that will have surfaces adjacent wall elements of an external corner define a plurality of spaced fastening holes 17 to allow the base to be mechanically fastened to a wall by mechanical fastening devices 18, in the case illustrated comprising screws.

Petting arm leg 16 of base 10 provides a "T" shaped element with perpendicularly extending cross element 19 at the outer extension of this leg. This cross element allows the interconnection of a vertically movable bracket structure to the leg for adjustable slidable motion thereon. Cross element 19 defines toothed rack 20 on the edge of one of its laterally extending arms to meshedly engage with a pinion carried by a petting arm bracket to provide a mechanically adjustable vertical motion of that bracket relative to petting arm leg 17.

Preferably base structure 10 is formed of some rigid durable material, such as one of the lighter metals or a harder plastic or resinous material. Its configuration, so long as it fulfills the essence specified, is not particularly critical nor are its dimensions, though its length should be appropriate to extend somewhat above the highest position of a petting arm that would be carried thereon to service the largest animals intended to be serviced so that appropriate angled support may be provided for that petting arm from the upper part of the base. Normally for general use the base will be about four feet in length, though this length is not required to service smaller dogs and ordinary sized cats.

Petting arm mounting bracket 21 is a rectilinear element defining "T" shaped channel 22 to slidably fit upon the outer portion of petting arm leg 16 of base 10. Channel 22 is preferably so dimensioned as to provide somewhat of a frictional fit upon petting leg 16 so that the bracket will be positionally maintained thereon against the forces of gravity and until manually manipulated to cause motion relative to that mounting base. Bracket 22 provides ratchet housing 23 which journals pinion 24 having knob-like handle 25 to aid its rotary manipulation. These elements are so configured and dimensioned that pinion 23 operatively interfits with rack 20 so that upon rotary manipulation of knob 25 pinion bracket 23 may be adjustably moved vertically relative to base 10. This rack and pinion structure is not remarkable, is known in the prior art, and is therefore not specified in any detail as it accomplishes those same purposes as the traditional structure. Preferably bracket 23 has some vertical extent to allow appropriate mounting of petting arm 11 thereon and frictional engagement with the base.

Petting arm 11 is a compound structure formed by inner arm portion 26 and outer arm portion 27 communicating in an articulating joinder allowing horizontal but not vertical motion.

Inner portion 26 of the petting arm comprises a square channel element forming approximately one-half of the total petting arm structure and is joined to the petting arm bracket 21 by hinge 28, communicating between the lower inner surface of the inner petting arm and the upper outer surface of petting arm bracket. Hinge 28 is so constituted as to allow the petting arm to extend upwardly from a vertically depending position more than 90 degrees to a raised position above the horizontal. The outer end portion of inner petting arm 26 defines yoke-like connector 29 defining channel 30 between its yoke arms to accept an interconnecting portion of outer petting arm 27. The inner petting arm is peripherally defined to create medial channel 31 which carries motivating mechanism 13.

Outer portion 27 of the petting arm provides a channel element similar in size and configuration to the inner portion of the petting arm. In its inner part the outer petting arm defines tongue element 32 to extend in pivotal fashion within channel 30 of yoke elements 29 of the inner petting arm where it is pivotally interconnected by headed pin 33 extending between the elements to provide pivotal axle for relative motion. The tongue element on its inner peripheral surface defines plural teeth 34 adapted to mechanically intercommunicate with motivating mechanism 13, as hereinafter further specified.

The outer end of outer portion 27 of the petting arm defines the yoke element comprising outermost spaced legs 35 defining channel 36 therebetween to pivotally mount petting element 12 for vertical motion.

Support bracket 37 is carried by petting arm leg 16 of base 10 at a spaced distance above the petting arm bracket. This support bracket is of similar cross-sectional configuration and construction to the petting arm bracket and provides pinion 38 journaled in pinion support 39 and activated by pinion knob 40 to adjustably vertically position the support bracket on base 10 in a fashion similar to that described for the petting arm bracket.

Flexible petting arm support 41 extends from this bracket 37 to intercommunicate with hook element 42 which may be releasably interconnected with eye 43 carried by the outer part of the inner portion of petting arm 26. Support element 41 is of a flexible nature and a length appropriate to maintain the petting arm in a horizontal position when connected thereto so that the support element maintains the arm in this horizontal position, but allows its motion upwardly against gravity bias if required in the operation of the petting arm. Support bracket 37 may be moved vertically responsive to the vertical position of the petting arm bracket to allow the support to accomplish the purpose assigned to it and if necessary, the length of support element 41 may be varied to allow further adjustment between these elements if required.

Petting element 12 comprises hand-like portion 44 structurally communicating with smaller wrist-like portion 45 configured in its inner end part to pivotally fit within channel 36 of yoke 35 defined by the outer end part of outer portion of petting arm 27. The wrist portion is journaled for vertical pivotal motion upon axle 46 extending perpendicularly between yoke legs 35 and its vertical motion is biased to a horizontal position by torsion spring 47 carried about axle 46 with one spring arm 48 communicating with the outer petting arm 27 and the other 48a communicating with the petting arm. The entire petting element, or at least its hand-like portion 44, is preferably formed with a flexible peripheral element defining a chamber filled with stuffing material to provide a resiliently deformable structure that moves somewhat in the same fashion as the human hand, were that hand performing the same petting functions as that element. The wrist portion 45 may be formed in the same fashion, may carry a rigid journaling structure or may be formed of a rigid material to provide better wear characteristics for that portion.

Driving mechanism 13 is shown in the partially cutaway cross-sectional view of FIG. 3. This mechanism comprises motor 49, carried in channel 31 of inner petting arm 26 at a spaced distance inwardly from the outer end, with its driving shaft 50 extending outwardly to irrotatably carry bevel gear 51 at its end. This bevel gear 51 communicates with a driven gear having lower beveled portion 52 to operatively communicate with bevel gear 51 and upper circular driving gear 53 meshedly intercommunicating with tooth portion 34 of tongue element 32 of the outer portion of the petting arm. The periphery of gear 53 has teeth over only approximately one-fourth of its periphery so that it will pivotally move outer petting arm 27 through an arc of about ninety degrees.

The axle 33 preferably comprises a bolt-like structure having threadedly engaged wing nut 54 and frictional washer 55 disposed between the pivotal elements to adjust pivotal friction therebetween. Torsion spring 56 is carried about the body of axle 33 with spring end 57 communicating with outer pivotal portion 27 of the petting arm and spring end 58 communicating with inner portion 26 of that arm so as to create a pivotal bias toward the direction opposite that in which the outer pivotal arm 27 is turned by motor 49. Bevel portion 52 and circular driving gear portion 53 are carried on vertically journaled shaft 59 in the inner petting arm 26 at a position appropriate to allow operation of the mechanism, as indicated. With this structure then the outer pivotal arm is moved through an arc of about ninety degrees by the motor and after this motion, since the motor is not in mechanical contact with that arm for a period of time, the spring bias caused by torsion spring 56 moves the arm back to its original position to cause a reciprocating horizontal pivotal motion in the outer petting arm simulating a human petting motion of an animal.

Motor 49 may be powered by various means such as a manually wound spring or electricity. In the case of an electrical motor, electric eye 59 may be positioned on base 10 to sense the position of animal 60, in petting position relative to the device, to responsively institute the operation of motor 49 and thusly the petting function of the device. If desired, some other type of position sensing switch (not shown) in a pad under the position whereat an animal would be positioned or elsewhere in or about the device may institute a similar operation. The electrical circuitry embodying the electric eye and its associated motor and powering source is illustrated in FIG. 7.

Having thusly described the structure of my invention, its operation may be understood.

Firstly, a petting device is formed according to the foregoing specification and the accompanying drawings. The device is then mechanically attached to a vertical structural element for support, as illustrated in FIG. 1, with the lower portion of base 10 positioned at floor level in an area where a pet may approach the device to be petted and scratched. The petting arm is then adjusted to appropriate vertical height by moving pinion knob 25 carried by petting arm bracket 21. The appropriate height for a pet normally is at approximately the level of its back when the pet is standing, though it may be desired to adjust the arm at a different vertical position. Support bracket 37 is then vertically adjusted so that support element 41 maintains the petting arm in a substantially horizontal position against gravity forces. The device in this condition is ready for operation in an automatic fashion, if it be provided with electric eye switching device 60, and otherwise it may be operated manually by other switching devices.

With the electric eye version of the device, the electric eye is set to determine when pet 61 is in position relative to the scratching arm to be petted and scratched thereby. The device then will automatically activate and operate when the pet comes to that position and outer portion 27 of the petting arm will move through an arc relative to the inner portion of that arm so that hand portion 40 carried by the outer petting arm may contact a pet to simulate petting and scratching as by a human hand. The pet may maintain some upward pressure against the bias of both hand portion 41 and petting arm 26, 27 to more realistically simulate the petting action. A pet will soon learn by itself to position itself appropriately to institute operation of the device and to operatively contact it or the pet may be readily instructed by known animal training methods to encourage this type of behavior.

When it be desired to store the device as during periods of non-use, petting arm bracket 21 may be moved to an appropriate vertical position, hook element 42 of support 41 may be released from eye 43 and the petting arm allowed to fold vertically downwardly. The device may be readily reassembled by reversing this operation when it be desired to position it for use.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and
What I claim is:

1. A mechanism for scratching and petting household pets comprising in combination:
   an elongate base having means for mounting in a vertical position on a structural member;
   an elongate "T" shaped petting arm leg extending a spaced distance from the base;
   a compound petting arm carried by a petting arm bracket slidably disposed on the petting arm leg of the base and having means for adjustable vertical motion on the petting arm leg of the base, said petting arm being hingeably carried by said petting arm bracket and having an outer arm portion pivotally communicating with an inner arm portion with means to reciprocatably move said outer arm portion through a predetermined arcuate course relative to the inner arm portion; and
   a petting element carried by the outermost part of the outer arm portion of the petting arm, said petting element biased to a horizontal position but pivotally movable in a vertical plane against such bias.

2. The invention of claim 1 wherein the means of moving the outer arm portion of the petting arm relative to the inner arm portion comprise mechanical means biasing the outer arm portion to a first position and a motor carried by one arm to drive a gear having teeth about a portion of its periphery that meshedly intercommunicate with a tongue element of the other arm that defines teeth about part of its periphery to intercommunicate with the motor driven gear to move the outer arm portion to a second position against its bias and thereafter allow return to the first position by reason of said bias.

3. The invention of claim 2 further characterized by the motor being electrically driven and controlled by a position sensing switch that senses the presence of an animal in petting position relative to said device to activate the motor responsive to such condition.

4. The invention of claim 1 having a second support bracket carried by the petting arm leg for adjustable vertical positioning with a flexible elongate support element communicating angularly downwardly therefrom to the petting arm to maintain the petting arm in a horizontal position and allow its motion upwardly therefrom.

5. A device for scratching and petting small household pets comprising in combination:
   an elongate base formed of at least two elongate intercommunicating legs, at least one of said legs having means for fastening to a structural support to vertically position the second leg so that it extends a spaced distance from the structural support, said second leg defining in its outer part a rack element and having configuration to slidably maintain a petting arm bracket in adjustable vertical position thereon;
   a compound petting arm hingeably interconnected with a petting arm bracket carried for vertical motion on the petting arm leg of the base, said petting arm being hingeably connected to the petting arm bracket for motion from a depending position adjacent the base to a horizontal extended position perpendicular to the base, and said petting arm having an inner arm portion pivotally interconnected with an outer arm portion with means to pivot the outer arm through a limited predetermined arc relative to the inner arm portion.

6. The invention of claim 5 further characterized by the petting arm having a petting element carried for vertical pivotal motion and extending outwardly from the outermost part of the petting arm, said petting element being biased to a position parallel to the petting arm but pivotally movable against its bias.

7. The invention of claim 5 further characterized by the pivotal interconnection of inner portion and outer portion of the petting arm comprising a tongue defined by one petting arm portion extending into a yoke defined by the other adjacent petting arm element with a pivotal axle extending therebetween and said tongue having first gear teeth about a part of its vertical outer periphery adapted to intermesh with adjacent second gear means having teeth about a part of the second gear periphery, and associated spring means to maintain said outer portion of the petting arm in a first position from which it is reciprocally arcuately moved by said gear means, and motor means of driving said second gear means.

8. The invention of claim 5 further having a support bracket vertically adjustably movable along the second leg of the base with a flexible elongate support element extending downwardly therefrom to releasably intercommunicate with the petting arm structure to prevent the petting arm structure from moving downwardly below a horizontal position but allow it to move upwardly from a horizontal position against its gravity bias.

* * * * *